(12) United States Patent
Wang (10) Patent No.: US 12,052,195 B2
(45) Date of Patent: Jul. 30, 2024

(54) METHODS, DEVICES AND COMPUTER READABLE MEDIUM FOR TRANSMISSION OF REFERENCE SIGNAL

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 579 days.

(21) Appl. No.: 17/296,026

(22) PCT Filed: Dec. 14, 2018

(86) PCT No.: PCT/CN2018/121324
§ 371 (c)(1),
(2) Date: May 21, 2021

(87) PCT Pub. No.: WO2020/118723
PCT Pub. Date: Jun. 18, 2020

(65) Prior Publication Data
US 2022/0014332 A1 Jan. 13, 2022

(51) Int. Cl.
*H04L 5/00* (2006.01)
(52) U.S. Cl.
CPC .......... *H04L 5/0051* (2013.01); *H04L 5/0007* (2013.01); *H04L 5/0058* (2013.01)
(58) Field of Classification Search
CPC ... H04L 5/0051; H04L 5/0007; H04L 5/0058; H04L 5/0053; H04L 5/0094
See application file for complete search history.

(56) References Cited

U.S. PATENT DOCUMENTS 10,383,147 B2    8/2019  Rajagopal et al.
2016/0381670 A1* 12/2016 Kim ..................... H04L 5/0064
                                                    370/329
(Continued)

FOREIGN PATENT DOCUMENTS

CN    106304351 A    1/2017
CN    107852716 A    3/2018
(Continued)

OTHER PUBLICATIONS

3GPP TSG RAN WG1 meeting#90, R1-1713871 Title: DL control signalling of CBG-based (re) transmission (Year: 2017).*
(Continued)

*Primary Examiner* — Faruk Hamza
*Assistant Examiner* — Abusayeed M Haque (57) ABSTRACT

Embodiments of the present disclosure relate to methods, devices and computer readable mediums for resource selection. The method comprises generating a sequence of a reference signal for Physical Sidelink Shared Channel, PSSCH based on a scrambling identity derived from a Physical Sidelink Control Channel, PSCCH; determining a time-domain resource based on the frequency-domain resource and partially based on an overlap relationship between a first set of resources allocated for the PSCCH and a second set of resources allocated for the PSSCH; and mapping the sequence to the time-domain resource and the frequency-domain resource for transmitting the reference signal. In this way, the reference signal could be transmitted via PSSCH efficiently in a case that the resources allocated for PSCCH is overlapped with the resources allocated for PSSCH.

20 Claims, 7 Drawing Sheets

(56) References Cited

U.S. PATENT DOCUMENTS

| | | | | |
|---|---|---|---|---|
| 2017/0289767 A1* | 10/2017 | Yu | ............................ | H04W 4/40 |
| 2018/0302889 A1* | 10/2018 | Guo | ...................... | H04B 17/309 |
| 2020/0252255 A1* | 8/2020 | Sorrentino | ............ | H04B 7/0456 |
| 2021/0135732 A1* | 5/2021 | Sun | ........................ | H04L 5/0048 |

FOREIGN PATENT DOCUMENTS

| | | | | |
|---|---|---|---|---|
| EP | 3 323 252 B1 | 6/2020 | | |
| WO | WO-2018175528 A1 * | 9/2018 | ............ | H04L 5/0087 |
| WO | WO-2019028603 A1 * | 2/2019 | ................ | H04L 1/00 |

OTHER PUBLICATIONS

Written Opinion for PCT/CN2018/121324, dated Apr. 29, 2019.

International Search Report for PCT/CN2018/121324, dated Apr. 29, 2019.

Japanese Office Action for JP Application No. 2021-533665 dated May 31, 2022 with English Translation.

Ericsson, Physical layer structures of NR V2X, 3GPP TSG RAN WG1 #94bis, R1-1811592, Sep. 28, 2018.

3rd Generation Partnership Project; Technical Specification Group Radio Access Network; NR; Physical channels and modulation(Release 15), 3GPP TS 38.211 V15.3.0, Sep. 27, 2018.

Vivo, Physical layer structure for NR sidelink, 3GPP TSG RAN WG1 #95, R1-1812306, Nov. 3, 2018.

Samsung, Discussion on physical layer structures for NR V2X, 3GPP TSG RAN WG1 #95, R1-1813866, Nov. 13, 2018.

Extended European Search Report dated Dec. 6, 2021 in European Application No. 18942915.2.

"Considerations on Physical Layer aspects of NR V2X", Qualcomm Incorporated, 3GPP TSG RAN WG1 Meeting #95, R1-1813421, 2018, Retrieved from: URL: <http://www.3gpp.org/ftp/Meeting%5F3GPP%5FSYNC/RAN1/Docs/R1%2D1813421%2Ezip> (16 pages total).

"Discussion on physical layer structures and procedure(s) of NR sidelink", Panasonic, 3GPP TSG RAN WG1 Meeting #94bis, R1-1810952, 2018, Retrieved from: URL: <http://www.3gpp.org/ftp/tsg%5Fran/WG1%5FRL1/TSGR1%5F94b/Docs/R1%2D1810952%2Ezip> (5 pages total).

* cited by examiner

METHODS, DEVICES AND COMPUTER READABLE MEDIUM FOR TRANSMISSION OF REFERENCE SIGNAL

CROSS REFERENCE TO RELATED APPLICATIONS

This application is a National Stage of International Application No. PCT/CN2018/121324 filed Dec. 14, 2018.

TECHNICAL FIELD

Embodiments of the present disclosure generally relate to the field of telecommunication, and in particular, to methods, devices and computer readable medium for the transmission of the reference signal.

BACKGROUND

Device to device (D2D) communication has been developed for years and have been extended to include vehicle-to-everything (V2X) communication. For example, in current telecommunication specifications such as the 3rd Generation Partnership Project (3GPP) specification Release 14, the extensions for the D2D work consist of support of V2X communication. V2X communication includes any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N).

For D2D communication, the Physical Sidelink Control Channel (PSCCH) is the equivalent to the Physical Downlink Control Channel (PDCCH) in cellular traffic over Uu, which contains the Sidelink Control Information (SCI). The receiving UE may receive and demodulation the Physical Sidelink Shared Channel (PSSCH) with the SCI. In general, before the transmission of the data, the transmitting UE may transmit the control information first. However, in a proposed option, the resources allocated for PSCCH and the resources allocated for PSSCH may overlap with each other, which may cause problems on the transmission of the reference signal via PSSCH.

SUMMARY

In general, example embodiments of the present disclosure provide methods and devices for the transmission of the reference signal.

In a first aspect, there is provided a method implemented at a terminal device. The method comprises generating a sequence of a reference signal for Physical Sidelink Shared Channel, PSSCH based on a scrambling identity derived from a Physical Sidelink Control Channel, PSCCH; determining a time-domain resource based on the frequency-domain resource and partially based on an overlap relationship between a first set of resources allocated for the PSCCH and a second set of resources allocated for the PSSCH; and mapping the sequence to the time-domain resource and the frequency-domain resource for transmitting the reference signal.

In a second aspect, there is provided a terminal device. The device comprises at least one processor; and at least one memory including computer program codes. The at least one memory and the computer program codes are configured to, with the at least one processor, cause the device at least to perform the method according to the first aspect.

In a third aspect, there is provided a computer readable medium having a computer program stored thereon which, when executed by at least one processor of a device, causes the device to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehiclemounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
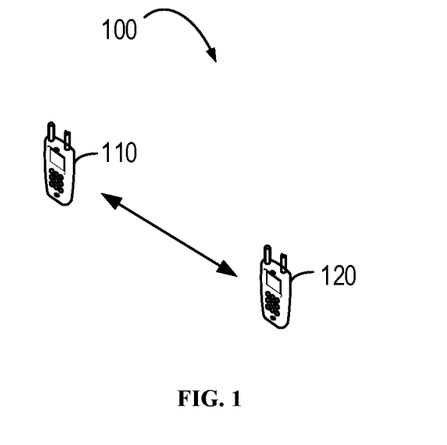
FIG. 1 shows an example communication network 100 in which embodiments of the present disclosure can be implemented.

FIG. 1 shows an example communication network 100 in which embodiments of the present disclosure can be implemented. The network 100 may refer to a Device to Device (D2D) communication network. For example, the network 100 may be considered as a Vehicle-to-Everything (V2X) communication network which may include any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N). The network 100 involves terminal device 110 and 120, which can communicate with each other. It would be appreciated that the number of terminal devices and the links there between are shown merely for illustration. There may be various other terminal devices in D2D communication in many other ways.

In the network 100, communication between terminal devices 110 and 120 can be performed via both Uu interface and direct links (or sidelinks). For the sidelink-based D2D or V2X communication, information is transmitted from a TX terminal device to one or more RX terminal devices in a broadcast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, the TX terminal device (for example, terminal device 110 shown in FIG. 1) may broadcast the Sidelink Control Information (SCI) to one or more RX terminal device (for example, terminal device 120 shown in FIG. 1). The RX may receive and demodulation the Physical Sidelink Shared Channel (PSSCH) with the SCI. In general, the period for broadcasting the SCI via PSCCH is prior to transmitting the data via PSSCH. Regarding PSCCH/PSSCH multiplexing, a new option of the transmission mode is proposed for Cyclic Prefix-Orthogonal Frequency Division Multiplexing (CP-OFDM). In this option, RAN 1 assumes that transient period is not needed between symbols containing PSCCH and symbols not containing PSCCH. That is to say, the resources allocated for PSCCH may overlap the resource allocated for PSSCH.

Meanwhile, the reference signal is transmitted via the PSSCH for channel estimation. 3GPP specification TS 38.211 specify different mapping types to mapping the sequence of the reference signal, i.e. DeModulation Reference Signal (DMRS) to corresponding resources in the PSSCH. The mapping types may comprise a DMRS mapping type A and a DMRS mapping type B. The DMRS mapping type A refers to a slot based mapping type. Based on the mapping type A, the sequence of DMRS may be mapped to the fixed OFDM symbol regardless of the resource allocation for the PSSCH. For example, the sequence of DMRS may be mapped to the OFDM symbol in the $2^{nd}$ or $3^{rd}$ symbol. On contrast, the DMRS mapping type B refers to non-slot based mapping type. Based on the mapping type B, the sequence of DMRS may be mapped to the first OFDM symbol assigned for PSSCH.

Once the resources allocated for PSCCH overlaps the resource allocated for PSSCH, the specified mapping type may not suitable for mapping the sequence to corresponding OFDM symbol in the resource allocation for the PSSCH. Specifically, PSSCH is divided into multiple parts due to the overlapping with PSCCH. FIG. 2A-2F shows examples of possible overlap relation between the PSCCH and the PSSCH. There are 14 OFDM symbols in one slot shown in FIG. 2A-2F.

Figure 2A:
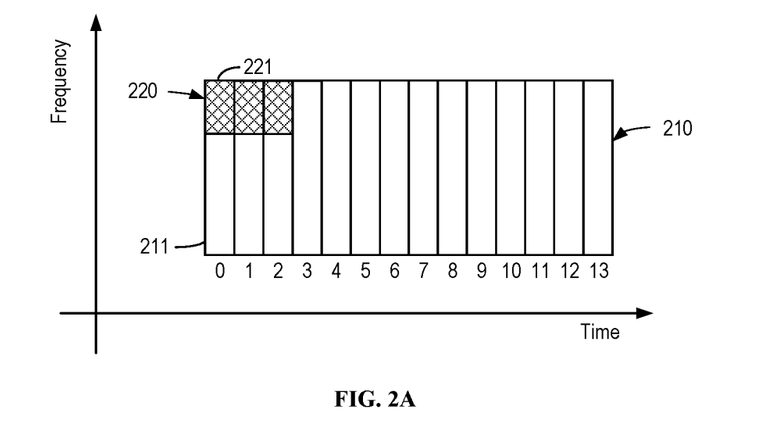
FIG. 2A-2F shows examples of possible overlap relation between the PSCCH and the PSSCH.
Figure 2B:
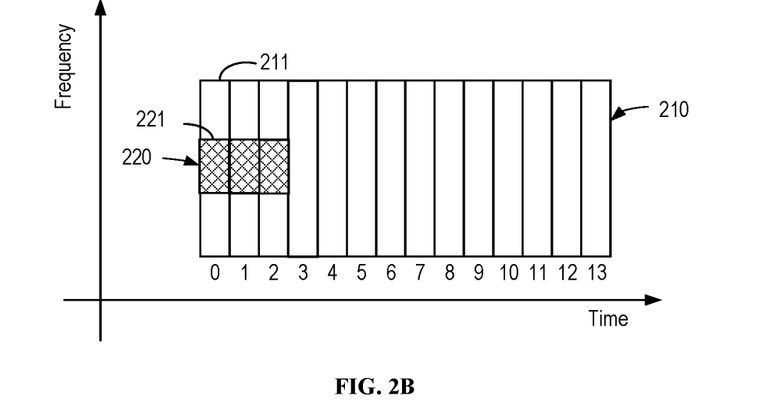
Figure 2C:
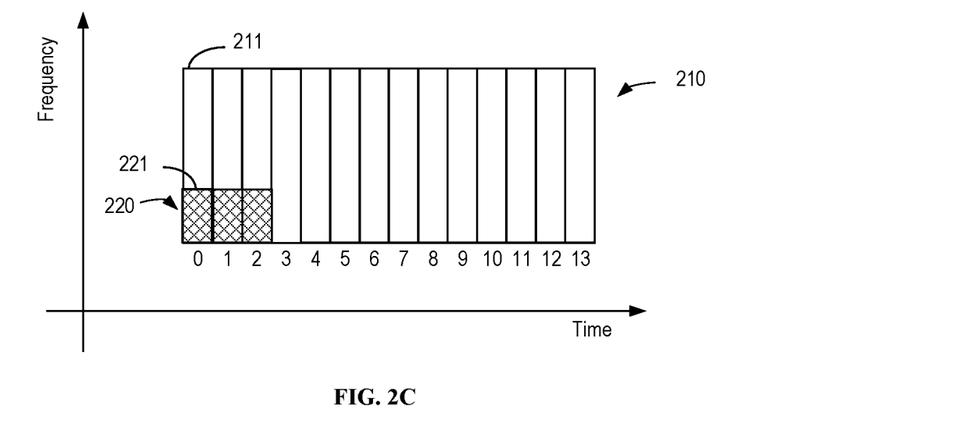
Figure 2D:
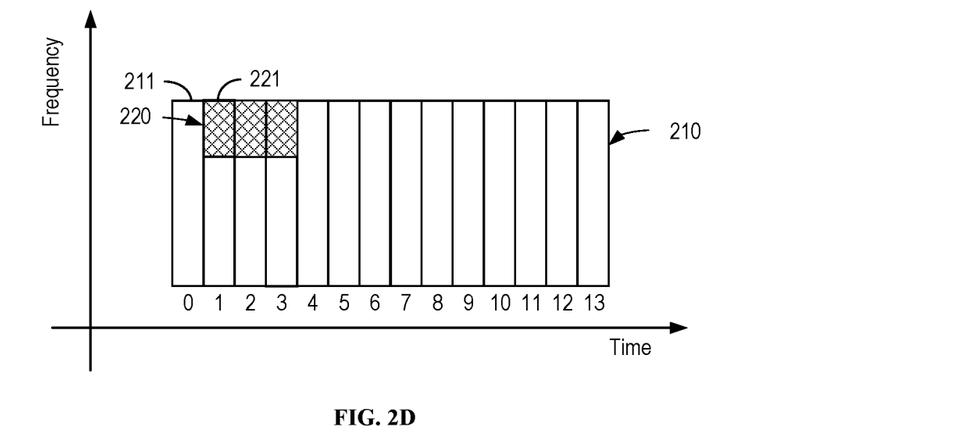
Figure 2E:
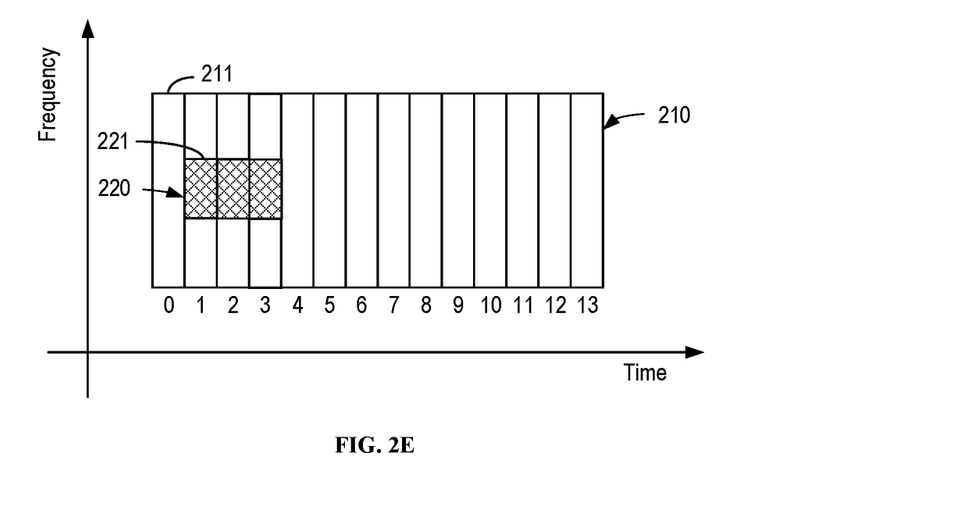
Figure 2F:
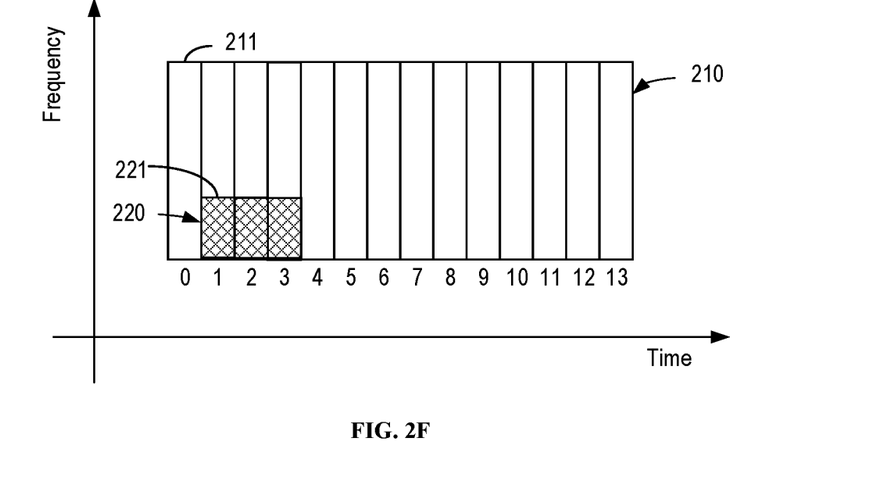

As shown in FIG. 2A-2F, in case of PSCCH and PSSCH are time-domain multiplexed and frequency-domain multiplexed, the possible overlap relation between the PSCCH and the PSSCH may be determined based on the location of the allocated resources 220 in the time and frequency domain for PSCCH and the location of the allocated resources 210 in the time and frequency domain for PSSCH. In general, the possible overlap relation between the PSCCH and the PSSCH may be divided into two types, i.e. the initial symbol 221 of the allocated resources for PSCCH and the initial symbol 211 of the allocated resources for PSSCH are located in a same symbol in the time domain, i.e. the $0^{th}$ symbol as shown in FIG. 2A-2C and the initial symbol of the allocated resources for PSCCH and the initial symbol of the allocated resources for PSSCH are located in different symbols in the time domain, i.e. the initial symbol 221 is located in the 1st symbol while the initial symbol 211 is located in the 0th symbol as shown in FIG. 2D-2F. Some embodiments of the present disclosure will be discussed according to the location relation of the initial symbol as mentioned above.

According to embodiments of the present disclosure, there is provided anew designed mechanism for the transmission of the reference signal in a case that the resources allocated for PSCCH is overlapped with the resources allocated for PSSCH. More details of the embodiments of the present disclosure will be discussed with reference to FIGS. 3 to 9.

Principle and implementations of the present disclosure will be described in detail below with reference to FIG. 3, which shows method 300 for the transmission of the reference signal according to example embodiments of the present disclosure. The method 300 can be implemented at the terminal device 110, which may be considered as a TX terminal device, as shown in FIG. 1. For the purpose of discussion, the method 300 will be described with reference to FIG. 1.

Figure 3:
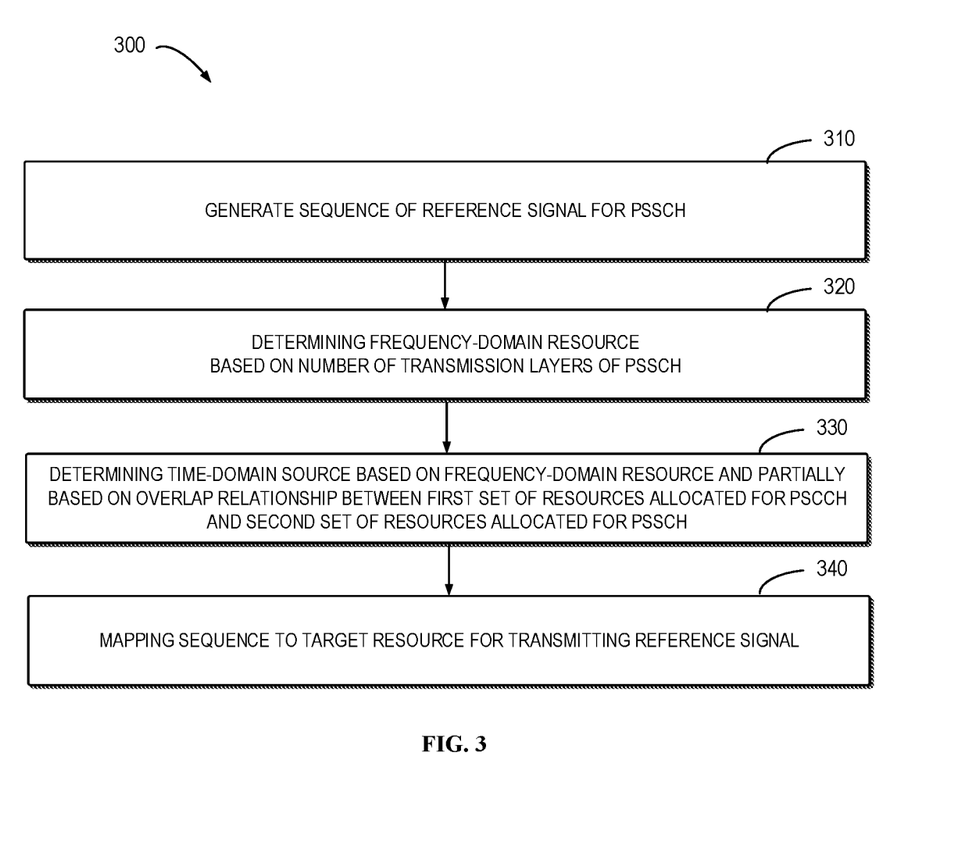
FIG. 3 shows a flowchart of an example method 300 for resource selection according to some embodiments of the present disclosure.

As shown in FIG. 3, at 310, the terminal device 110 generates a sequence of a reference signal for PSSCH based on a scrambling identity derived from the PSCCH that scheduling the PSSCH. As an option, the reference signal herein may be referred to as DMRS.

In some embodiments, the DMRS sequence for PSSCH may be generated based on the Equation (1) as follow:

$$r(n) = \frac{1}{\sqrt{2}}(1 - 2 \cdot c(2n)) + j\frac{1}{\sqrt{2}}(1 - 2 \cdot c(2n+1)) \quad (1)$$

where c(i) is defined in 3GPP specification TS 38.211 and the pseudo random generator of c(i) shall be initialized with Equation (2) and (3) as below:

$$c_{init} = (2^{17}(N_{symb}^{slot} n_{s,f}^{\mu} + l + 1)(2N_{ID}+1) + 2N_{ID}) \bmod 2^{31} \quad (2)$$

or:

$$c_{init} = (2^{16}(N_{symb}^{slot} n_{s,f}^{\mu} + l + 1)(N_{ID}+1) + N_{ID}) \bmod 2^{31} \quad (3)$$

where $N_{symb}^{slot}$ may be referred to as the number of symbols per slot, l may be referred to as the OFDM symbol number within the slot, $n_{s,f}^{\mu}$ may be referred to as the slot number within a frame, $N_{ID}$ may be referred to as a scrambling identity derived from the PSCCH that scheduling the PSSCH. For PSSCH, the value of $N_{ID}$ is derived from the information conveyed in the associated PSCCH. For example, the value of $N_{ID}$ may be the decimal representation of one field in PSCCH.

In some embodiments, the DMRS sequence r(n) may be mapped to the intermediate quantity $\tilde{a}_{k,l}^{(\tilde{p}_j,\mu)}$ according to the Equation (4) as below:

$$\tilde{a}_{k,l}^{(\tilde{p}_j,\mu)} = w_f(k')w_t(l')r(2n+k') \quad (4)$$

where $w_f(k')$ and $w_t(l')$ may represent the orthogonal cover frequency division and time division with k'=0, 1 and l=$\bar{l}$+l', n=0, 1, . . . , $\tilde{p}_j$ may represent as the index of the antenna port, μ is the subcarrier spacing configuration of the carrier, j=0, 1, . . . , v−1 is the index of PSSCH transmission layer;

$$k = \begin{cases} 4n + 2k' + \Delta & \text{for Configuration type 1} \\ 6n + k' + \Delta & \text{for Configuration type 2} \end{cases}$$

wherein the configuration types may represent corresponding configuration of the number of the DMRS antenna ports, and the frequency location and Code Division Multiplexing (CDM) group of each antenna port, as defined in 3GPP specification TS 38.211. The configuration type is (pre-)configured or specified per carrier, or (pre-)configured or specified per resource pool and l'=0 is preferably.

$w_f(k')$, $w_t(l')$ and Δ are given in the Table 1 below for Configuration type 1, and both k' and Δ correspond to $\tilde{p}_0, \ldots, \tilde{p}_{v-1}$.

TABLE 1

| | Configuration type 1 | | | | | |
|---|---|---|---|---|---|---|
| | CDM | | $w_f(k')$ | | $w_t(l')$ | |
| $\tilde{p}$ | group | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

$w_f(k')$, $w_t(l')$ and Δ are given in the Table 2 below for Configuration type 2, and both k' and Δ correspond to $\tilde{p}_0, \ldots, \tilde{p}_{v-1}$.

TABLE 2

| | Configuration type 2 | | | | | |
|---|---|---|---|---|---|---|
| | CDM | | $w_f(k')$ | | $w_t(l')$ | |
| $\tilde{p}$ | group | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

The intermediate quantity $\tilde{a}_{k,l}^{(\tilde{p}_0,\mu)}=0$, if either k' or Δ does not correspond to $\tilde{p}_0, \ldots, \tilde{p}_{v-1}$.

Then, in order to conform to the transmit power of PSSCH DMRS and mapped to physical resources for transmission, the intermediate quantity $\tilde{a}_{k,l}^{(\tilde{p}_j,\mu)}$ may be precoded by multiplying with the amplitude scaling factor $\beta_{PSSCH}^{DMRS}$. The transmit power of PSSCH DMRS is calculated by the terminal device 110 according to specific power control parameters and power control algorithm, the power control parameters and power control algorithm can be specified, configured or pre-configured.

The resource elements $\tilde{a}_{k,l}^{(\tilde{p}_j,\mu)}$ may be selected from the common resource blocks allocated for PSSCH transmission, or from the resource block set for PSSCH transmission.

The reference point for k is subcarrier 0 in common resource block 0, or subcarrier 0 of the lowest-numbered resource block of the resource block set for PSSCH transmission.

Back to FIG. 3, at 320, the terminal device 110 determines the frequency-domain resources for transmitting the reference signal based on the number of the transmission layers of PSSCH.

In some embodiments, the terminal device 110 may determine the number of available antenna ports of the reference signal, the number of transmission layers of the PSSCH. The terminal device 110 may further determine an antenna port for transmitting the reference signal based on the number of transmission layers, the number of available antenna ports of the reference signal and the scrambling identity derived from the PSCCH that scheduling the PSSCH and determine the frequency-domain resource based on the determined antenna port. The number of transmission layers of the PSSCH may be equal to the required number of the antenna ports for transmitting the reference signal.

In some embodiments, the terminal device 110 may determine the number of transmission layers of the PSSCH. The terminal device 110 may further determine an antenna port for transmitting the reference signal based on the number of transmission layers and determine the frequency-domain resource based on the determined antenna port. That is to say, the antenna ports for transmitting the reference signal may be specified according to the number of transmission layers of the PSSCH.

In some embodiments, in a case that only one symbol DMRS is supported for PSSCH, i.e. l'=0, for single layer PSSCH transmission, i.e. the number of transmission layers of the PSSCH is 1, the antenna ports for transmitting the reference signal may be determined based on the Equation (5) as below:

$$\tilde{p}_0 = \begin{cases} \text{mod}(N_{ID}, 4) & \text{Configuration type 1} \\ \text{mod}(N_{ID}, 6) & \text{Configuration type 2} \end{cases}, \text{or} \quad (5)$$

The Equation (6) can be derived from the Equation (5) as follow:

$$\tilde{p}_0 = \begin{cases} 2 \cdot \text{mod}(N_{ID}, 2) & \text{Configuration type 1} \\ 2 \cdot \text{mod}(N_{ID}, 3) & \text{Configuration type 2} \end{cases}, \text{or} \quad (6)$$

In some embodiments, it may be specified that $\tilde{p}_0=0$ for both configuration types. The terminal device 110 assumes that the number of CDM group without data is 1 which corresponds to the CDM group that $\tilde{p}_0$ belonging to.

In some embodiments, in a case that only one symbol DMRS is supported for PSSCH, i.e. l'=0, for two layers PSSCH transmission, i.e. the number of transmission layers of the PSSCH is 2, the antenna ports for transmitting the reference signal may be determined based on the Equation (7) as below:

$$\tilde{p}_0 = \begin{cases} 2 \cdot \text{mod}(N_{ID}, 2) & \text{Configuration type 1} \\ 2 \cdot \text{mod}(N_{ID}, 3) & \text{Configuration type 2} \end{cases}, \tilde{p}_1 = \tilde{p}_0 + 1, \text{or} \quad (7)$$

In some embodiments, it may be specified that $\tilde{p}_0=0$, $\tilde{p}_1=1$ for both configuration types. The terminal device 110 assumes that the number of CDM group without data is 1 which corresponds to the CDM group that $\tilde{p}_0$ belonging to.

In some embodiments, in a case that only one symbol DMRS is supported for PSSCH, i.e. l'=0, for three layers PSSCH transmission, i.e. the number of transmission layers of the PSSCH is 3, it may be specified that $\tilde{p}_0=0$, $\tilde{p}_1=1$, $\tilde{p}_2=2$ for configuration type 1 and for configuration type 2, the antenna ports for transmitting the reference signal may be determined based on the Equation (8) as below:

$$\tilde{p}_0 = 3 \cdot \text{mod}(N_{ID}, 2), \tilde{p}_1 = \tilde{p}_0 + 1, \tilde{p}_2 = \tilde{p}_0 + 2 \quad (8)$$

The terminal device 110 assumes that the number of CDM group without data is 2 which corresponds to the CDM group that $\tilde{p}_0$, $\tilde{p}_1$ and $\tilde{p}_2$ belonging to.

In some embodiments, in a case that only one symbol DMRS is supported for PSSCH, i.e. l'=0, for four layers PSSCH transmission, i.e. the number of transmission layers of the PSSCH is 4, it may be specified that $\tilde{p}_0=0$, $\tilde{p}_1=1$, $\tilde{p}_2=2$, $\tilde{p}_3=3$ for configuration type 1 and for configuration type 2, the antenna ports for transmitting the reference signal may be determined based on the Equation (9) as below:

$$\tilde{p}_0 = 2 \cdot \text{mod}(N_{ID}, 2), \tilde{p}_1 = \tilde{p}_0 + 1, \tilde{p}_2 = \tilde{p}_0 + 2, \tilde{p}_3 = \tilde{p}_0 + 3 \quad (9)$$

The terminal device 110 assumes that the number of CDM group without data is 2 which corresponds to the CDM group that $\tilde{p}_0$, $\tilde{p}_1$, $\tilde{p}_2$ and $\tilde{p}_3$ belonging to.

Back to FIG. 3, at 330, the terminal device 110 determines a time-domain resource based on the frequency-domain resource and partially based on an overlap relationship between a first set of resources allocated for the PSCCH and a second set of resources allocated for the PSSCH.

In some embodiments, the terminal device 110 may determining the overlap relationship the overlap relationship indicating one of the following: a first overlapping range between the first set of resources allocated for PSCCH and the second set of resources allocated for PSSCH in the frequency domain; and a second overlapping range between the first set of resources allocated for PSCCH and the second set of resources allocated for PSSCH in the time domain. The terminal device 110 may further determine at least one subset from the second set of resources based on overlap relationship and determine the time-domain resource in the at least one subset.

In some embodiments, the terminal device 110 may also determine the time-domain resource in the second set of resources directly by using the mapping type A or B, as mentioned above.

In some embodiments, the terminal device 110 may obtain a first location of an initial symbol in the first set of resources and a second location of an initial symbol in the second set of resources. The terminal device 110 may further determine a corresponding relationship between the first location and the second location and determine the at least one subset based on the corresponding relationship.

In some embodiments, the terminal device 110 may determine a third location of an initial symbol in the at least one subset and obtain a predetermined transmission pattern based on the third location. The terminal device 110 may further determine the time-domain resource in the at least one subset based on the predetermined transmission pattern.

As described with reference to FIG. 2A-2F, the possible overlap relation between the PSCCH and the PSSCH may be determined based on the location of the allocated resources 220 in the time and frequency domain for PSCCH and the location of the allocated resources 210 in the time and frequency domain for PSSCH. Substantially, the possible overlap relation between the PSCCH and the PSSCH may comprise two types, i.e. the initial symbol of the allocated resources for PSCCH and the initial symbol of the allocated resources for PSSCH are located in a same symbol in the time domain and the initial symbol of the allocated resources for PSCCH and the initial symbol of the allocated resources for PSSCH are located in different symbols in the time domain. Various embodiments will be described in detail with reference to FIG. 4-FIG. 9 as below.

In some embodiment, in case of a part of PSCCH and the associated PSSCH are transmitted using overlapping time-domain resources in non-overlapping frequency-domain resources, but another part of the associated PSSCH and/or another part of the PSCCH are transmitted using non-overlapping time-domain resources, and PSCCH starts from the first symbol of the slot, for example, the overlapping pattern shown in FIG. 2A-2C.

In some embodiments, the mapping type A, shown in Table 3, for DMRS PUSCH may be also used for this case. For this case, l is defined relative to the start of the slot, $\bar{l}$ is given in the Table 3 as below, where $l_0$ is (pre-)configured or specified, preferably, $l_0=2$ or 3. "dmrs-AdditionalPosition" in Table 3 is indicated in the associated PSCCH, or (pre-)configured per resource pool. "Duration in symbols" includes both the PSSCH symbols overlapping with associated PSCCH in frequency domain and PSSCH symbols transmitted using non-overlapping time-domain resources with associated PSCCH.

TABLE 3

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0$ | $l_0$ | $l_0$ |
| 6 | $l_0$ | $l_0$ | $l_0$ | $l_0$ |
| 7 | $l_0$ | $l_0$ | $l_0$ | $l_0$ |
| 8 | $l_0$ | $l_0$, 7 | $l_0$, 7 | $l_0$, 7 |
| 9 | $l_0$ | $l_0$, 7 | $l_0$, 7 | $l_0$, 7 |
| 10 | $l_0$ | $l_0$, 9 | $l_0$, 6, 9 | $l_0$, 6, 9 |
| 11 | $l_0$ | $l_0$, 9 | $l_0$, 6, 9 | $l_0$, 6, 9 |
| 12 | $l_0$ | $l_0$, 9 | $l_0$, 6, 9 | $l_0$, 5, 8, 11 |
| 13 | $l_0$ | $l_0$, 11 | $l_0$, 7, 11 | $l_0$, 5, 8, 11 |
| 14 | $l_0$ | $l_0$, 11 | $l_0$, 7, 11 | $l_0$, 5, 8, 11 |

Figure 4:
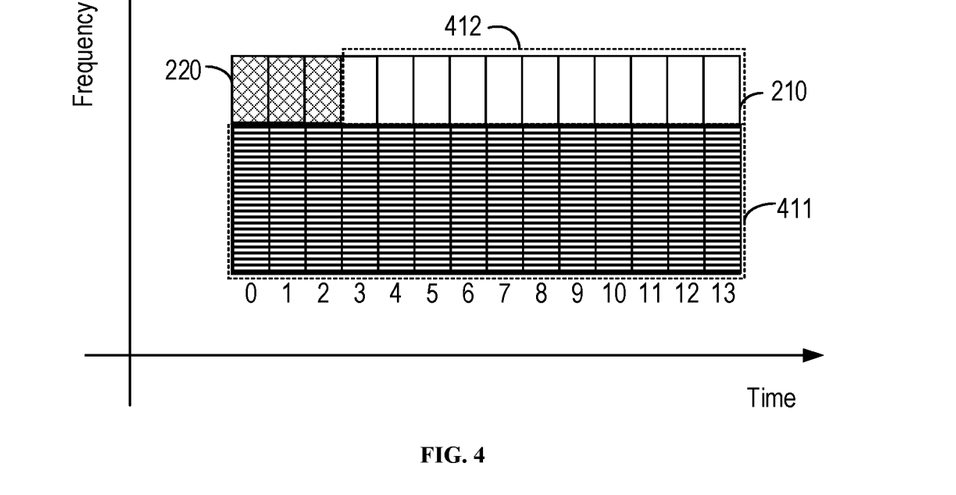
FIG. 4 shows an example of some embodiments of the present disclosure.

In some embodiment, as shown in FIG. 4, the second set of resources may be divided into 2 parts, i.e. one part of the PSSCH that transmitted using non-overlapping frequency-domain resources with associated PSCCH, i.e. part 411 and the other part of the PSSCH that transmitted using overlapping frequency-domain resources with associated PSCCH, i.e. part 412. The terminal device 110 may determine the time-domain resource in the part 411 and part 412, respectively.

For the part 411, l is the same as the embodiment described above, i.e. direct adopt the .mapping type A. For the part 412, l is defined relative to the start of the PSSCH, $\bar{l}$ is given in the Table 4 below, where $l_0=0$. "dmrs-AdditionalPosition" is indicated in the associated PSCCH, or (pre-)configured per resource pool and "Duration in symbols" is the total number of PSSCH symbols of this part 412 of the PSSCH.

TABLE 4

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

Figure 5:
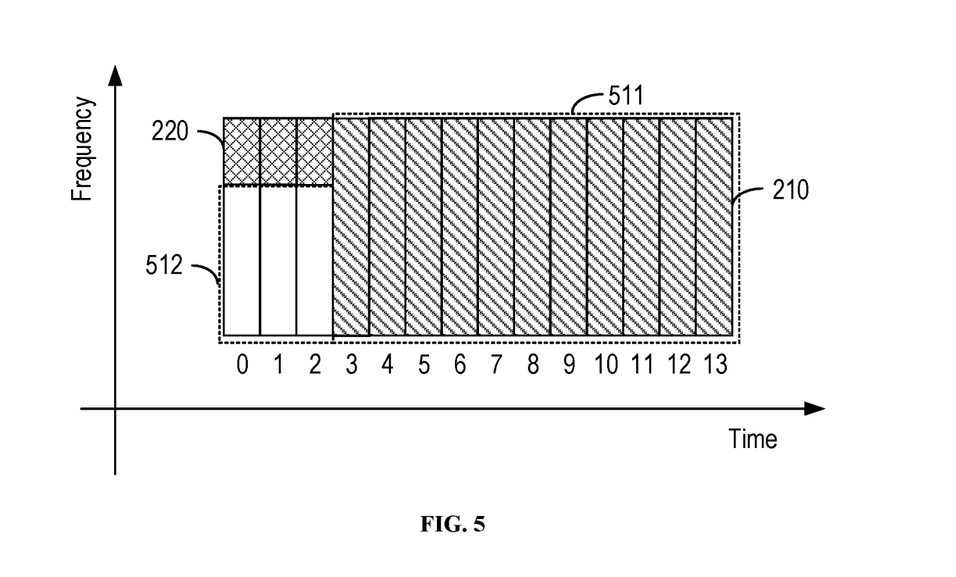
FIG. 5 shows an example of some embodiments of the present disclosure.

As another option shown in FIG. 5, the second set of resources may be divided into 2 parts, which are different from the parts shown in FIG. 4. That is, one part 512 that transmitted using non-overlapping frequency-domain resources with associated PSCCH and the other part 511 that transmitted using overlapping frequency-domain resources with associated PSCCH. For the part 511, l is the same as that of the part 412. For the part 512, l is the same as that of the part 411.

In some embodiment, still for same scenario as shown in FIG. 4-5, in which the first symbol in PSCCH is located at the same location as that of the first symbol in PSSCH, the mapping type B, shown in Table 5, for DMRS PUSCH may be also used for this case. For this case, l is defined relative to the start of the first PSSCH symbol in the slot, $\bar{l}$ is given in the Table 5 below, where $l_0=0$. "dmrs-AdditionalPosition" is indicated in the associated PSCCH, or (pre-)configured per resource pool and "Duration in symbols" includes both the PSSCH symbols overlapping with associated PSCCH in frequency domain and PSSCH symbols transmitted using non-overlapping time-domain resources with associated PSCCH.

TABLE 5

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

In some embodiment, in case of a part of PSCCH and the associated PSSCH are transmitted using overlapping time-domain resources in non-overlapping frequency-domain resources, but another part of the associated PSSCH and/or another part of the PSCCH are transmitted using non-overlapping time-domain resources, and PSCCH starts from the second symbol of the slot, for example the overlapping pattern shown in FIG. 2D-FIG. 2F.

Similarly, in some embodiments, the mapping type A, shown in Table 3, for DMRS PUSCH may be also used for this case.

Figure 6:
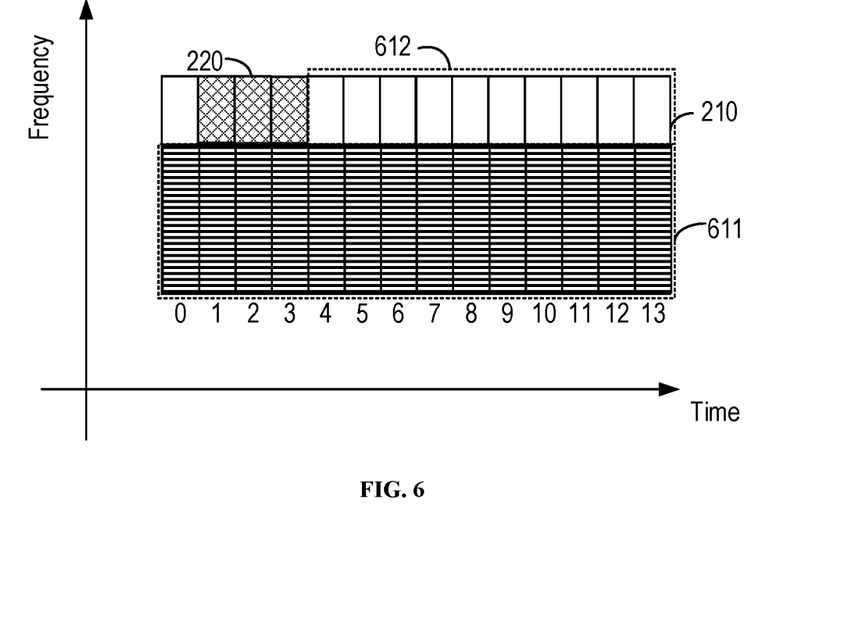
FIG. 6 shows an example of some embodiments of the present disclosure.

In some embodiments, as shown in FIG. 6, for the part 611 of the PSSCH that transmitted using non-overlapping frequency-domain resources with associated PSCCH, $l$ is the same as that of the part 411 shown in FIG. 4. For the part 612 of the PSSCH that transmitted after associated PSCCH and using overlapping frequency-domain resources with associated PSCCH, $l$ is defined relative to the firs PSSCH symbol after associated PSCCH, $\bar{l}$ is given in the Table 6 as below, where $l_0=0$. "dmrs-AdditionalPosition" is indicated in the associated PSCCH, or (pre-)configured per resource pool and "Duration in symbols" is the total number of PSSCH symbols after the last PSCCH symbol in the slot, i.e. the first symbol is not included.

TABLE 6

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

Figure 7:
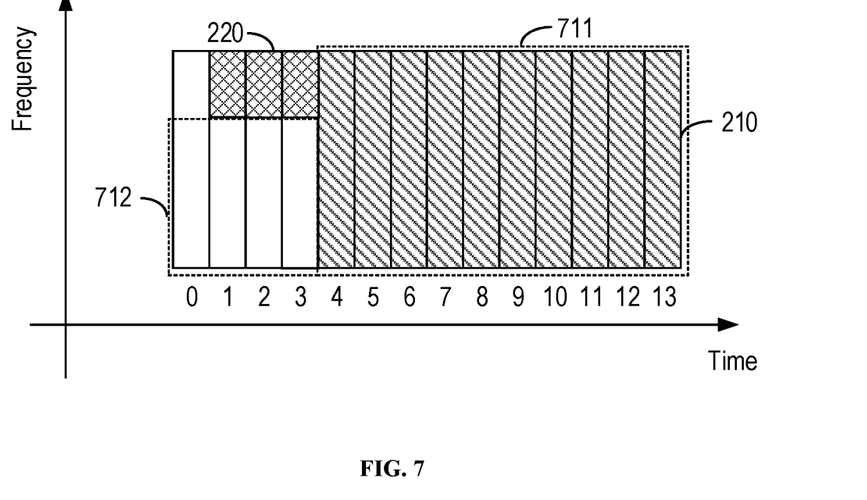
FIG. 7 shows an example of some embodiments of the present disclosure.

In some embodiment, as shown in FIG. 7, the second set of resources may be divided into 2 parts, which are different from the parts shown in FIG. 6. That is, one part 712 that transmitted using non-overlapping frequency-domain resources with associated PSCCH and the other part 711 that transmitted using overlapping frequency-domain resources with associated PSCCH. For the part 711, $l$ is the same as that of the part 612. For the part 712, $l$ is the same as that of the part 611.

In some embodiment, still for same scenario as shown in FIG. 6-7, in which the first symbol in PSCCH is located at the different location as that of the first symbol in PSSCH, the mapping type B, shown in Table 7, for DMRS PUSCH may be also used for this case. For this case, $l$ is defined relative to the start of the slot, $\bar{l}$ is given in the table below, where $l_0=0$. "dmrs-AdditionalPosition" is indicated in the associated PSCCH, or (pre-)configured per resource pool and "Duration in symbols" includes both the PSSCH symbols overlapping with associated PSCCH in frequency domain, and PSSCH symbols transmitted using non-overlapping time-domain resources with associated PSCCH.

TABLE 7

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

Figure 8:
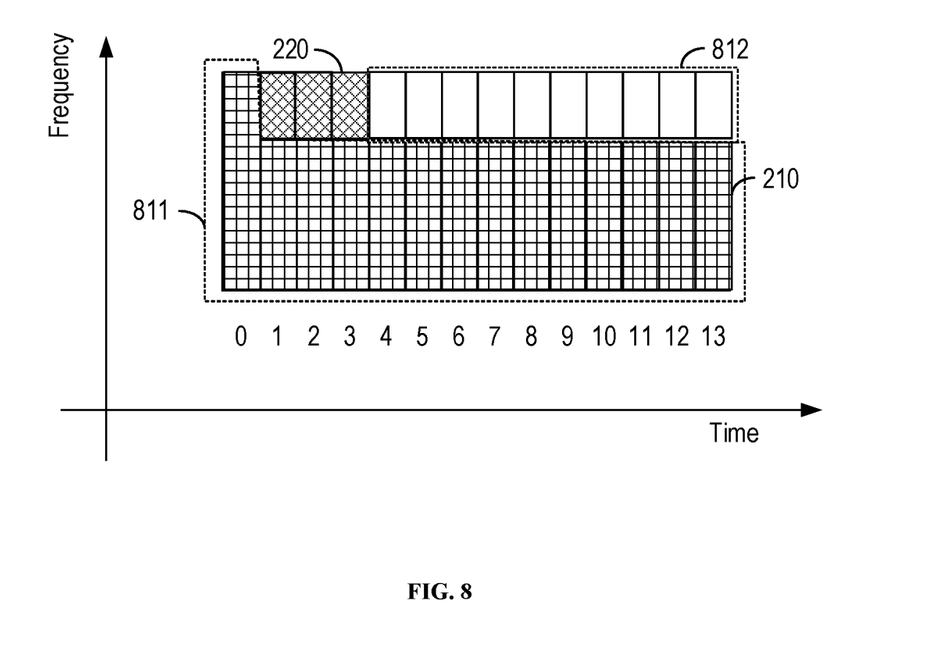
FIG. 8 shows an example of some embodiments of the present disclosure.

In some embodiments, as shown in FIG. 8, For the part 812 of the PSSCH that transmitted after associated PSCCH and using overlapping frequency-domain resources with associated PSCCH, $l$ is defined relative to the firs PSSCH symbol after associated PSCCH, $\bar{l}$ is given in the Table 8 as below, where $l_0=0$. "dmrs-AdditionalPosition" is indicated in the associated PSCCH, or (pre-)configured per resource pool and "Duration in symbols" is the total number of PSSCH symbols after the last PSCCH symbol in the slot, i.e. the first symbol is not included. For the first symbol and the part 811 of the PSSCH that transmitted using non-overlapping frequency-domain resources with associated PSCCH, same as above

TABLE 8

Configuration for DMRS

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

Figure 9:
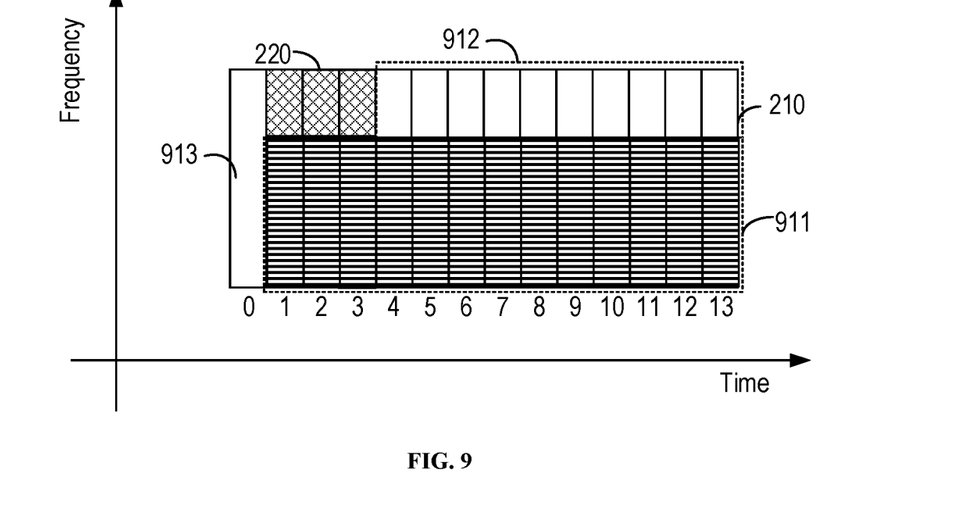
FIG. 9 shows an example of some embodiments of the present disclosure.

In some embodiments, as shown in FIG. 9, for the part 912 of the PSSCH that transmitted after associated PSCCH and using overlapping frequency-domain resources with associated PSCCH, $l$ is defined relative to the firs PSSCH symbol after associated PSCCH, $\bar{l}$ is given in Table 9 as below, where $l_0=0$. "dmrs-AdditionalPosition" is indicated in the associated PSCCH, or (pre-)configured per resource pool and "Duration in symbols" is the total number of PSSCH symbols after the last PSCCH symbol in the slot, i.e. the first symbol is not included. For the first symbol 913, $l$ is the same as above.

For the part 911 of the PSSCH that transmitted after the first symbol and using non-overlapping frequency-domain resources with associated PSCCH, $l$ is the same as above.

TABLE 9

| Duration in symbols | DM-RS positions $\bar{l}$ dmrs-AdditionalPosition | | | |
|---|---|---|---|---|
| | 0 | 1 | 2 | 3 |
| <4 | — | — | — | — |
| 4 | $l_0$ | $l_0$ | $l_0$ | $l_0$ |
| 5 | $l_0$ | $l_0, 4$ | $l_0, 4$ | $l_0, 4$ |
| 6 | $l_0$ | $l_0, 4$ | $l_0, 4$ | $l_0, 4$ |
| 7 | $l_0$ | $l_0, 4$ | $l_0, 4$ | $l_0, 4$ |
| 8 | $l_0$ | $l_0, 6$ | $l_0, 3, 6$ | $l_0, 3, 6$ |
| 9 | $l_0$ | $l_0, 6$ | $l_0, 3, 6$ | $l_0, 3, 6$ |
| 10 | $l_0$ | $l_0, 8$ | $l_0, 4, 8$ | $l_0, 3, 6, 9$ |
| 11 | $l_0$ | $l_0, 8$ | $l_0, 4, 8$ | $l_0, 3, 6, 9$ |
| 12 | $l_0$ | $l_0, 10$ | $l_0, 5, 10$ | $l_0, 3, 6, 9$ |
| 13 | $l_0$ | $l_0, 10$ | $l_0, 5, 10$ | $l_0, 3, 6, 9$ |
| 14 | $l_0$ | $l_0, 10$ | $l_0, 5, 10$ | $l_0, 3, 6, 9$ |

In this way, the problem on the transmission of the reference signal caused by the overlap of the PSCCH and PSSCH may be solved.

Figure 10:
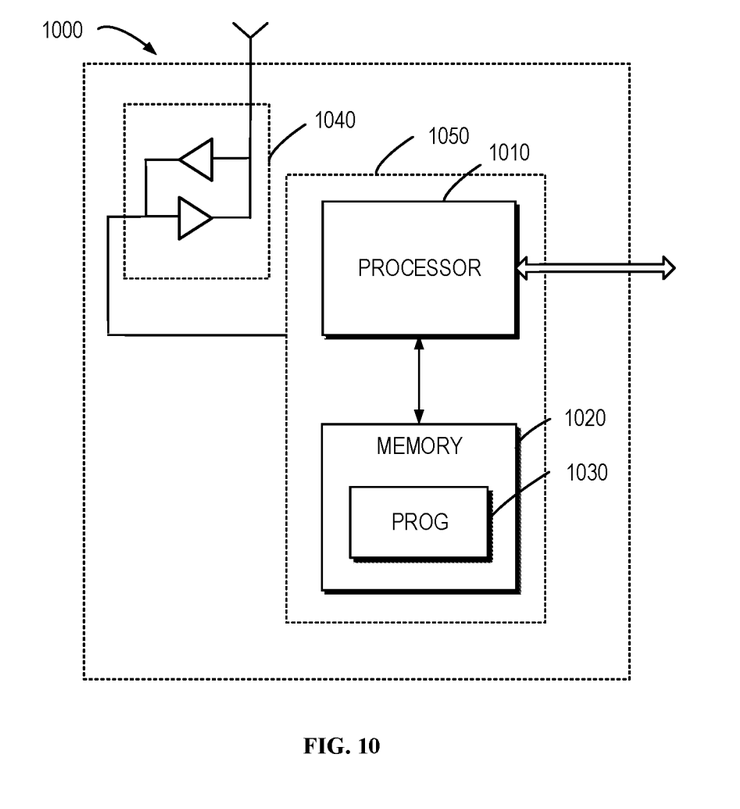
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of a terminal device 120 as shown in FIG. 1. Accordingly, the device 1000 can be implemented at or as at least a part of the terminal device 110.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 3 to 10. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1010 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 o 10 Generally, program modules include routines, programs, libraries, objects, classes, components, data structures, or the like that perform particular tasks or implement particular abstract data types. The functionality of the program modules may be combined or split between program modules as desired in various embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, the method comprising:
   generating a sequence of demodulation reference signals (DMRS) for a Physical Sidelink Shared Channel (PSSCH), wherein,
      a resource for, transmission of the PSSCH and a Physical Sidelink Control Channel (PSCCH) associated with the PSSCH, starts from a first starting position in a first slot,
      the PSCCH carries information scheduling the PSSCH,
      a first set of symbols, starting from a second starting position in the first slot, is allocated for the PSCCH within the resource,
      the second starting position is no earlier in time domain than the first starting position, and
      a second set of possible symbols of the DMRS, within the resource, includes the second starting position;
   mapping the sequence to a third set of one or more symbols from the second set, wherein each index of the one or more symbols is defined relative to the first starting position; and
   transmitting the DMRS.

2. The method of claim 1, wherein the third set is determined based on a duration of the resources.

3. The method of claim 1, wherein a first symbol within the third set is the second starting position.

4. The method of claim 3, wherein in the time domain, a second symbol within the third set is four symbols after the first symbol in a case where number of the one or more symbols in the third set is two.

5. The method of claim 3, wherein in the time domain, a second symbol within the third set is three symbols after the first symbol, and
   a third symbol within the third set is three symbols after the second symbol in a case where number of the one or more symbols in the third set is three.

6. The method of claim 3, wherein in the time domain, a second symbol within the third set is four symbols after the first symbol, and
   a third symbol within the third set is four symbols after the second symbol in a case where number of the one or more symbols in the third set is three.

7. The method of claim 3, wherein in the time domain, a second symbol within the third set is five symbols after the first symbol, and
   a third symbol within the third set is five symbols after the second symbol in a case where number of the one or more symbols in the third set is three.

8. The method of claim 3, wherein in the time domain, a second symbol within the third set is three symbols after the first symbol,
   a third symbol within the third set is three symbols after the second symbol, and
   a fourth symbol in within the third set is three symbols after the third symbol, in a case where number of the one or more symbols in the third set is four.

9. The method of claim 1, wherein the sequence of the DMRS is $$r(n) = \frac{1}{\sqrt{2}}(1 - 2c(2n)) + j\frac{1}{\sqrt{2}}(1 - 2c(2n+1)),$$

wherein a pseudo-random sequence c(i) is initialized with $c_{init}=(2^{17}(N_{symb}^{slot}n_{s,f}^{\mu}+l+1)(2N_{ID}+1)+2N_{ID}) \bmod 2^{31}$, where l is an orthogonal frequency division multiplexing (OFDM) symbol number within the slot, $n_{s,f}^{\mu}$ is the slot number within a frame, and Nip is derived from the PSCCH.

10. The method of claim 1, wherein the first set comprises three symbols.

11. A terminal device comprising:
    a controller configured to:
    generate a sequence of a demodulation reference signal (DMRS) for a Physical Sidelink Shared Channel (PSSCH), wherein,
       for a resource for, transmission of the PSSCH and a Physical Sidelink Control Channel (PSCCH) associated with the PSSCH, starts from a first starting position in a first slot,
       the PSCCH carries information scheduling the PSSCH,
       a first set of symbols, starting from a second starting position in the first slot, is allocated for the PSCCH within the resource,
       the second starting position is no earlier in time domain than the first starting position, and
       a second set of possible symbols of the DMRS, within the resource, includes the second starting position; and
    map the sequence to a third set of one or more symbols from the second set, wherein each index of the one or more symbols is defined relative to the first starting position; and
    a transceiver configured to transmit the DMRS.

12. The terminal device of claim 11, wherein the third set is determined based on a duration of the resource.

13. The terminal device of claim 11, wherein a first symbol within the third set is the second starting position.

14. The terminal device of claim 13, wherein in the time domain, a second symbol within the third set is four symbols after the first symbol in a case where number of the one or more symbols in the third set is two.

15. The terminal device of claim 13, wherein in the time domain, a second symbol within the third set is three symbols after the first symbol, and
a third symbol within the third set is three symbols after the second symbol in a case where number of the one or more symbols in the third set is three.

16. The terminal device of claim 13, wherein in the time domain,
a second symbol within the third set is four symbols after the first symbol, and
a third symbol within the third set is four symbols after the second symbol in a case where number of the one or more symbols in the third set is three.

17. The terminal device of claim 13, wherein in the time domain,
a second symbol within the third set is five symbols after the first symbol, and
a third symbol within the third set is five symbols after the second symbol in a case where number of the one or more symbols in the third set is three.

18. The terminal device of claim 13, wherein in the time domain,
a second symbol within the third set is three symbols after the first symbol,
a third symbol within the third set is three symbols after the second symbol, and
a fourth symbol within the third set is three symbols after the third symbol, in a case where number of the one or more symbols in the third set is four.

19. The terminal device of claim 11, wherein the sequence of the DMRS is $$r(n) = \frac{1}{\sqrt{2}}(1 - 2c(2n)) + j\frac{1}{\sqrt{2}}(1 - 2c(2n+1)),$$

wherein a pseudo-random sequence $c(i)$ is initialized with $c_{init}=(2^{17}(N_{symb}^{slot}n_{s,f}^{\mu}+l+1)(2N_{ID}+1)+2N_{ID})\mod 2^{31}$, where l is an orthogonal frequency division multiplexing (OFDM) symbol number within the slot, $n_{s,f}^{\mu}$ is the slot number within a frame, and $N_{ID}$ is derived from the PSCCH.

20. The terminal device of claim 11, wherein the first set comprises three symbols.

* * * * *